UNITED STATES PATENT OFFICE.

LEONARD H. DYER, OF GREENWICH, CONNECTICUT.

CONCRETE.

1,369,794.     Specification of Letters Patent.     Patented Mar. 1, 1921.

No Drawing.     Application filed September 30, 1918. Serial No. 256,216.

*To all whom it may concern:*

Be it known that I, LEONARD H. DYER, a citizen of the United States, residing in the town of Greenwich, county of Fairfield, and State of Connecticut, have invented certain new and useful Improvements in Concrete, of which the following is a specification.

My invention relates to improvements in concrete and the principal object I have in view is to lighten the weight of the finished product.

I attain this object by means of an improved aggregate.

The aggregate, according to my invention, is hollow. It may be made of any shape, and of any suitable size. By making it hollow the usual weight of crushed stone or gravel ordinarily utilized for the aggregate is reduced and a much lighter finished product is secured with equal strength.

My improved aggregate is formed of hollow metal bodies. These bodies may be of cast metal, such as iron, but they are preferably made of sheet metal such as iron or steel. Any shape may be chosen, as spherical, oblate, cylindrical, cubical or irregular. They may be all of the same size and shape or may be of different sizes and shapes chosen for different uses or all combined in the same structure. If the bodies are made of sheet metal they may be each made of a single piece suitably stamped or swaged to shape, or they may be made of several parts, two for example, like a sheet metal box with a telescopic cover. The sheet metal may be made very thin, but enough strength being required to prevent crushing or distortion. Preferably they should be more or less water tight, otherwise they will fill with the matrix and the desired light weight unattained.

These bodies if made of sheet iron or steel may be used with the usual matrix of sand and cement without further treatment, the surface of each body forming a naturally rough surface for attachment to the matrix through natural rusting or they may be artificially roughened by either roughening the sheet metal before it is formed into the bodies or the bodies may be roughened after they are completed. If desired the bodies may be coated with an enamel to give a smooth surface for attachment to the matrix, thus imitating the action of gravel aggregate.

The new aggregate of proper size is adapted to be combined with a matrix of sand, cement and water and mixed and molded or otherwise employed as is customary with concrete using existing aggregates.

If desired, the new aggregate can be combined with aggregate composed of crushed stone or gravel, if it should be desired to save cost at the expense of light weight.

Having now described my invention, what I claim as new, and desire to secure by Letters Patent, is:—

1. Concrete, having the aggregate composed of hollow metal bodies with thin walls.

2. Concrete, having the aggregate composed of hollow sheet metal bodies.

3. Concrete, having the aggregate composed of hollow sheet metal bodies exteriorly coated.

4. Concrete, the combination with the matrix, of an aggregate embedded in said matrix, said aggregate being formed of hollow sheet iron bodies, stamped or swaged to shape.

5. Concrete having aggregate elements composed of hollow metal bodies with thin walls.

This specification signed and witnessed this 26th day of September, 1918.

LEONARD H. DYER.

In presence of—
L. W. DOYLE,
JOSEPHINE D. DYER.